United States Patent
Usui

(10) Patent No.: US 6,615,060 B1
(45) Date of Patent: Sep. 2, 2003

(54) COMMUNICATION DEVICE EFFECTIVELY CONTROLLING POWER SUPPLY, METHOD OF CONTROLLING POWER SUPPLY, AND MEDIUM

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/496,541

(22) Filed: Feb. 2, 2000

(30) Foreign Application Priority Data

Apr. 2, 1999 (JP) .......................................... 11-027163

(51) Int. Cl.[7] .............................. H04B 1/38; H04M 1/00
(52) U.S. Cl. ...................... 455/574; 455/343; 340/7.32
(58) Field of Search ................................. 455/574, 127, 455/343, 572, 575; 370/311; 340/7.32, 7.33, 7.34, 7.36

(56) References Cited

U.S. PATENT DOCUMENTS

| 5,613,235 A | * | 3/1997 | Kivari et al. .................. 331/14 |
| 5,943,613 A | * | 8/1999 | Wendelrup et al. ............ 331/18 |
| 6,029,061 A | * | 2/2000 | Kohlschmidt ................ 327/144 |
| 6,081,733 A | * | 6/2000 | Hietala et al. ............. 340/7.34 |
| 6,088,602 A | * | 7/2000 | Banister ..................... 340/7.34 |

FOREIGN PATENT DOCUMENTS

| CN | 1115194 A | 1/1996 |
| WO | WO 95/10141 | 4/1995 |

* cited by examiner

Primary Examiner—William Trost
Assistant Examiner—Simon Nguyen
(74) Attorney, Agent, or Firm—Scully, Scott, Murphy & Presser

(57) ABSTRACT

A digital cellular phone suspends power supplies of circuits as many as possible in a predetermined time period during which a signal is neither received nor sent. The predetermined time period is mostly measured by counting a clock signal of a low frequency and measured for a very short time by counting a clock signal of a high frequency. In restarting the suspending power supplies, a symbol clock can be reproduced with the same phase as a suspended phase, because the phone includes a counter 143 to hold phase timing of the symbol clock when the power supply of the related circuit is suspended.

17 Claims, 8 Drawing Sheets

COMMUNICATION DEVICE EFFECTIVELY CONTROLLING POWER SUPPLY, METHOD OF CONTROLLING POWER SUPPLY, AND MEDIUM

BACKGROUND OF THE INVENTION

1. Field of the Invention

The invention relates to a communication device which receives digital data via a radio mobile communication system and, in particular, to a digital demodulating circuit in the communication device.

2. Description of the Related Art

In a previous digital cellular phone used in a mobile radio communication system of the type described, radio signals are firstly received through an antenna and a desired frequency signal is then selected from the received signals to be subjected to demodulation and to obtain a demodulated signal. The demodulated signal is converted into a voice signal and is consequently supplied to a receiver of the cellular phone to be reproduced into a voice.

In a mobile radio communication system which includes a digital cellular phone as mentioned above, $\pi/4$ shift DQPSK is often adopted as a modulating method on a transmission side while a delay detecting method is used on a reception side to demodulate signals which are subjected to the modulating method.

A digital cellular phone of the type described often has a receiver which uses such a delay detecting method. Specifically, such a receiver comprises a phase detecting circuit, a phase difference detecting circuit, and a clock reproducing circuit. The phase detecting circuit detects a phase of the selected signal on the basis of reproduced symbol clock signals reproduced by the clock reproducing circuit and the selected signal, and produces a phase signal. The phase difference detecting circuit holds a phase signal at a time point of the symbol clock signal, receives the next phase signal at the next time point of the symbol clock signal, and produces a difference of the both phase signals as a phase shift signal. The clock reproducing circuit reproduces a symbol clock signal using the phase signals, and supplies the symbol clock signal to the phase detecting circuit and the phase difference detecting circuit.

Phases of the selected signals are shifted by $\pm\pi/4$ or $\pm 3\pi/4$ each other at each time point of the symbol clock signal and digital data signals are demodulated based on the values of the shifted phases.

A similar configuration of demodulating device is disclosed in Japanese Laid Open Publications Nos. H06-6398 (namely, 6398/1994), H06-261085 (namely, 261085/1994), H10-190568 (namely, 190568/1998), H09-18405 (namely, 18405/1997), H10-107730 (namely, 107730/1998), H10-257004 (namely, 257004/1998), H09-321694 (namely, 321694/1997), and H10-145467 (namely, 145467/1998).

At any rate, to demodulate a signal correctly, symbol timing of the selected signal should be coincident with the symbol clock signal from the clock reproducing circuit.

Herein, it is to be considered that such a digital cellular phone is repeatedly turned on or off by a user or a subscriber, which may be called intermittent receiving. In this case, power supplies to circuits are suspended in an inactive state. Under circumstances, when the power supplies are restarted, timing of the symbol clock signal would not be coincident with the symbol timing of the selected signal. In such a case, the selected signal can not be received without timing adjustment again. In other words, timing adjustment is indispensable to make the timing of the symbol clock signal and the symbol timing of the selected signal coincident with each other.

Thus, in a digital cellular phone which carries out the intermittent receiving, it is required to keep at least the clock reproducing circuit active even if the power supplies for main circuits are suspended. Further, it is also required to keep a demodulation clock signal (a clock signal used for demodulating) active since the symbol clock signal is generated based on the demodulation clock signal which has a frequency higher than that of the symbol clock signal. Furthermore, it is also required to keep an oscillator active which generates a reference frequency signal since the demodulation clock signal is generated by using the reference frequency signal.

In this way, keeping a plurality of circuits active causes power consumption to increase. In particular, when the demodulation clock signal is being generated and the oscillator is being generating a signal which has the reference frequency, electric power is seriously consumed during a waiting state as a frequency of a signal used in the circuits becomes high. For example, in the previous circuit, the reference frequency is 14.4 MHz and the demodulation clock signal is 2.688 MHz.

A portable data communication device, such as the cellular phone, requires portability from its characteristics. Therefore, it is important to decrease power consumption and extend a life of battery for such a device.

SUMMARY OF THE INVENTION

Therefore, it is an object of the invention to provide a cellular phone which is capable of decreasing power consumption and which consequently has a long life time without exchanging its battery.

Also, it is an object of the invention to provide a cellular phone which can reduce power consumption while the cellular phone is put into a waiting state.

Further, it is an object of the invention to provide a cellular phone which can quickly respond to a proper symbol clock signal as well as to reduce power consumption of the cellular phone during the waiting state.

Still further, it is an object of the invention to provide a symbol timing holding circuit which can be used for a digital cellular phone and can quickly and correctly generate a symbol clock signal when a call is restarted.

Still further, it is an object of the invention to provide a time measuring unit which can measure a correct time with decreasing power consumption by measuring a time for intermittent reception of a radio signal at a communication device such as a digital cellular phone, using a low frequency signal and a high frequency signal.

According to a first aspect of the invention, there is provided a communication device which intermittently takes receiving status to receive and demodulate a radio signal, and non-receiving status not to receive and demodulate the radio signal. The communication device comprises two oscillators each of which generates a frequency of signal (the frequencies being differ from each other), and a calculator which determines a time period of the non-receiving status with reference to a relationship between the frequencies of the signals from the two oscillators.

According to a second aspect of the invention, a communication device which receives digital data via a radio signal is provided. The communication device comprises a first oscillator which generates a first frequency of a first signal, a second oscillator which generates a second frequency of a second signal, a symbol clock circuit which generates a symbol clock signal by using the second signal, and a controller which suspends supply of the second signal to the symbol clock circuit to stop generating the symbol clock for a predetermined time period when the digital data is expected not to be received and which controls to suspend power supplies to the first oscillator and the second oscillator for a time period which is shorter than the predetermined time period and which is a part of the predetermined time period.

According to a third aspect of the invention, there is provided a method of measuring a time period of non-receiving status used in a communication device which intermittently takes receiving status to receive and demodulate a radio signal, and non-receiving status not to receive and demodulate the radio signal. The method comprises the steps of generating a frequency of signal and the other frequency of signal, and determining the time period of the non-receiving status by calculating with the frequencies of the signals.

According to a fourth aspect of the invention, there is provided a method of controlling power supplies of circuits in a communication device which receives digital data via a radio signal and comprises a first oscillator which generates a first frequency of a first signal, a second oscillator which generates a second frequency of a second signal, and a symbol clock circuit which generates a symbol clock signal by using the second signal. The method comprises the steps of suspending supply of the second signal to the symbol clock circuit for a predetermined time period to stop generating the symbol clock, and suspending power supplies to the first oscillator and the second oscillator for a time period which is shorter than the predetermined time period and which is a part of the predetermined time period.

According to a fifth aspect of the invention, there is provided a recording medium readable by a computer, tangibly embodying a program of instructions executable by the computer to perform a method of measuring a time period in a communication device which receives digital data via a radio signal. The method comprises the steps of determining a first repeat number of cycles of a first signal and a second repeat number of cycles of a second signal having a frequency higher than the frequency of the first signal so that the sum of the product of a time period of a cycle of the first signal by the first repeat number and the product of a time period of a cycle of the second signal by the second repeat number is equal to a predetermined time period or is approximated in a range of the predetermined time period, and measuring the predetermined time period by repeating a cycle of the first signal a plurality of times corresponding to the first repeat number and repeating a cycle of the second signal a plurality of times corresponding to the second repeat number.

According to a sixth aspect of the invention, there is provided a recording medium readable by a computer, tangibly embodying a program of instructions executable by the computer to perform a method of controlling power supplies of circuits in a communication device which receives digital data via a radio signal and comprises a first oscillator which generates a first frequency of a first signal, a second oscillator which generates a second frequency of a second signal, and a symbol clock circuit which generates a symbol clock signal by using the second signal. The method comprises the steps of suspending the second signal to the symbol clock circuit for a predetermined time period to stop generating the symbol clock signal, and suspending power supplies to the first oscillator and the second oscillator for a time period which is shorter than the predetermined time period and which is a part of the predetermined time period.

DESCRIPTION OF THE PREFERRED EMBODIMENT

A symbol timing holding circuit according to the invention is applicable to a digital cellular phone, for example, to hold timing of a symbol clock signal used for demodulating a digital signal. Considering the above, description is firstly made about the digital cellular phone.

Figure 1:
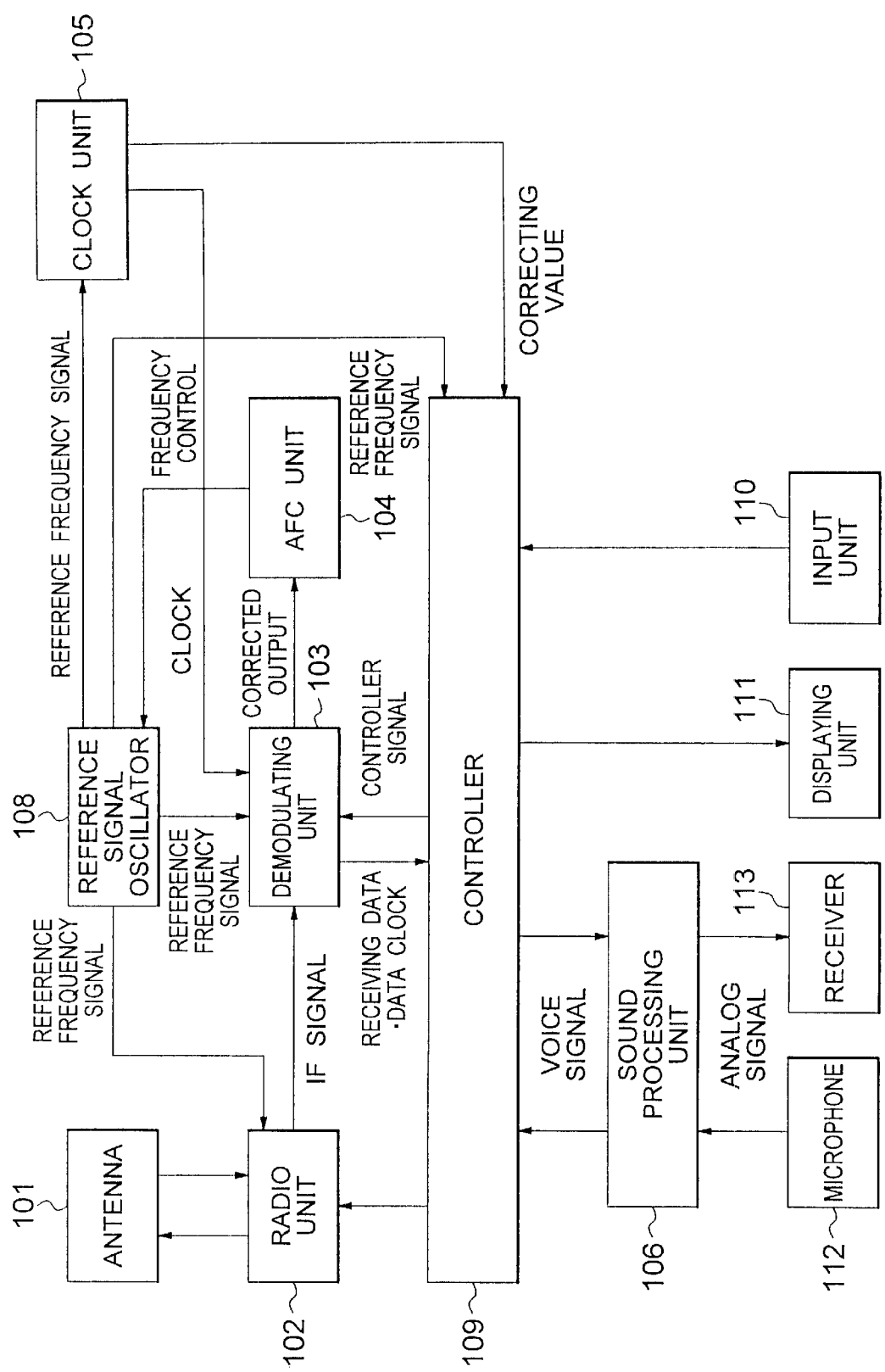
FIG. 1 shows a block diagram of a digital cellular phone of the invention.

The digital cellular phone shown in FIG. 1 includes an antenna 101, a radio unit 102, a demodulating unit 103, an AFC unit 104, a clock unit 105, a sound processing unit 106, a reference signal oscillator 108, a controller 109, a input unit 110, a displaying unit 111, a microphone 112, and a receiver 113.

In the digital cellular phone, the radio unit 102 at first receives signals which are given through the antenna 101. Then, the radio unit 102 selects a desired signal from the received signals, performs frequency conversion, amplifies the converted signal, generates an IF signal based on the amplified signal, and supplies the IF signal to the demodulating unit 103. The demodulating unit 103 demodulates the IF signal and supplies the signal to the controller 109 as reception data.

In a digital cellular phone system which includes the illustrated digital cellular phone, $\pi/4$ shift DQPSK is assumed to be adopted as a modulating method. In this connection, it is assumed that, as a demodulating method which corresponds to the modulating method, a delay detecting method or a coherent detecting method is frequently used.

Herein, it is surmised that the demodulating unit 103 includes a demodulating circuit operable on the basis of the delay detecting method. A general demodulating circuit according to the delay detecting method is disclosed in Japanese Laid Open Publication No. H11-112590 (namely, 112590/1999).

Next, the controller 109 processes the receiving data received from the demodulating unit 103 and supplies a voice signal to the sound processing unit 106. The sound processing unit 106 converts the voice signal to an analog signal and sends it to the receiver 113. The receiver 113 receives the analog signal and then outputs a sound corresponding to the analog signal.

On the other hand, a voice signal received from the microphone 112 is converted to a digital signal by the sound processing unit 106, passed through the controller 109, modulated at the radio unit 102, and transmitted from the antenna 102 by using a carrier wave of a predetermined frequency. This transmission process is not directly related to the invention, and therefore detail description about this is omitted.

Further, the input unit 110 controls user interface and passes designations from user and a telephone number to the controller 109. The displaying unit 111 displays a received telephone number and the like.

The clock unit 105 generally generates a clock signal which is used to control power supply timing of elements for intermittent reception according to the invention. In addition, the clock signal is indicative of a current time which may be displayed on the displaying unit 111.

The reference signal oscillator 108 generates, with a high precision, a reference frequency signal having a reference frequency. The reference frequency signal is delivered to the radio unit 102, the controller 109, the demodulating unit 103, and the clock unit 105. The oscillator 108 is structured by TCXO (Temperature Compensated Crystal Oscillator) and therefore accurately generates the reference frequency signal.

The AFC (Automatic Frequency Control) unit 104 controls the reference signal oscillator 108 so that the reference frequency signal becomes equal to a base station frequency signal.

Figure 2:
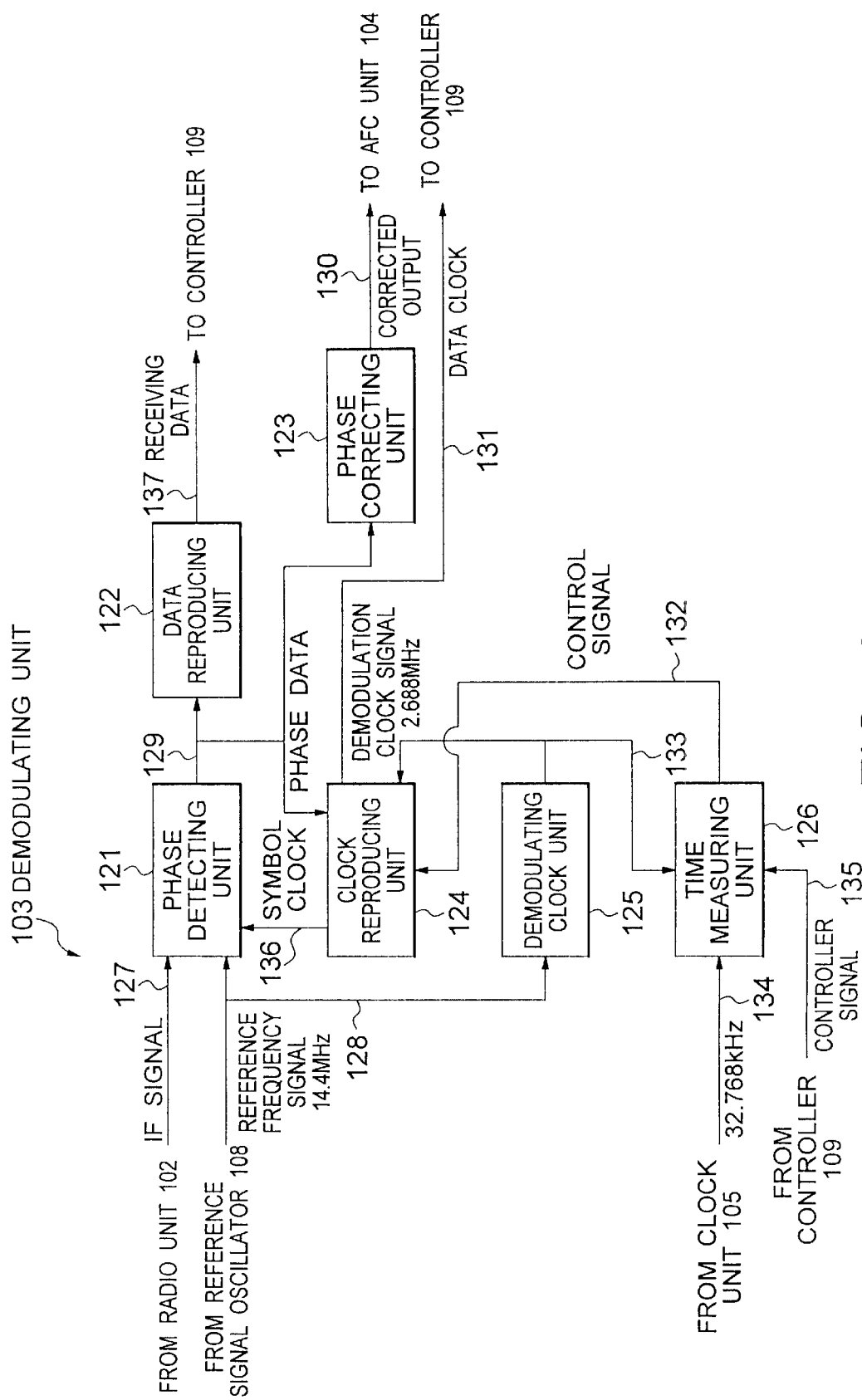
FIG. 2 shows a block diagram representing details of a demodulating unit 103 shown in FIG. 1.

Referring to FIG. 2, detail description is made about the demodulating unit 103 shown in FIG. 1.

A phase detecting unit 121 included in the demodulating unit 103 receives the IF signal (depicted by 127), the reference frequency signal of 14.4 MHz (depicted by 128), and a symbol clock signal 136. The phase detecting unit 121 delivers a phase data signal 129 of the IF signal 127 to a data reproducing unit 122, a phase correcting unit 123, and a clock reproducing unit 124 in timed relation to the symbol clock signal 136. Herein, the IF signal 127 is given from the radio unit 102 to the demodulating unit 103 while the reference frequency signal 128 and the symbol clock signal 136 are given from the reference signal oscillator 108 and the clock reproducing unit 124, respectively.

Supplied with the phase data signal 129 from the phase detecting unit 121, the data reproducing unit 122 produces the receiving data signal 137, and supplies it to the controller 109 shown in FIG. 1.

Responsive to the phase data signal 129, the phase correcting unit 123 performs phase correction of the received phase data signal 129 and supplies the corrected phase data signal to the AFC unit 104 as a corrected output 130.

The demodulating clock unit 125 is structured by a PLL circuit and supplies a demodulation clock signal 133 (2.688 MHz) to both the clock reproducing unit 124 and the time measuring unit 126 in response to the reference frequency signal 128 sent from the reference signal oscillator 108 shown in FIG. 1.

The clock reproducing unit 124 frequency divides the demodulation clock signal 133 by a factor of 128 to generate a symbol clock 136 (21 kHz). The symbol clock 136 of 21 kHz is supplied to the phase detecting unit 121.

In addition, the illustrated clock reproducing unit 124 further frequency divides the demodulation clock signal 133 by another factor of 64 to generate a data clock signal 131 of 42 kHz.

Further, the clock reproducing unit 124 adjusts phase timing of the symbol clock signal 136 to that of the data clock signal 131 on the basis of the phase difference of the phase data signals 129 between the first half of a symbol period and the second half of the symbol period. The clock reproducing unit 124 is operable to make the phase timing coincide with symbol timing of the IF signal 127.

In FIG. 2, the time measuring unit 126 counts a clock signal 134 and the demodulation clock signal 133 and produces a control signal 132 for every period which corresponds to the count number directed by a controller signal 135. The time measuring unit 126 serves to control supply of the demodulation clock signal 133 to a counter included in the clock reproducing unit 124.

Herein, it should be noted that the illustrated demodulating unit 103 can be specified by the time measuring unit 126.

Figure 3:
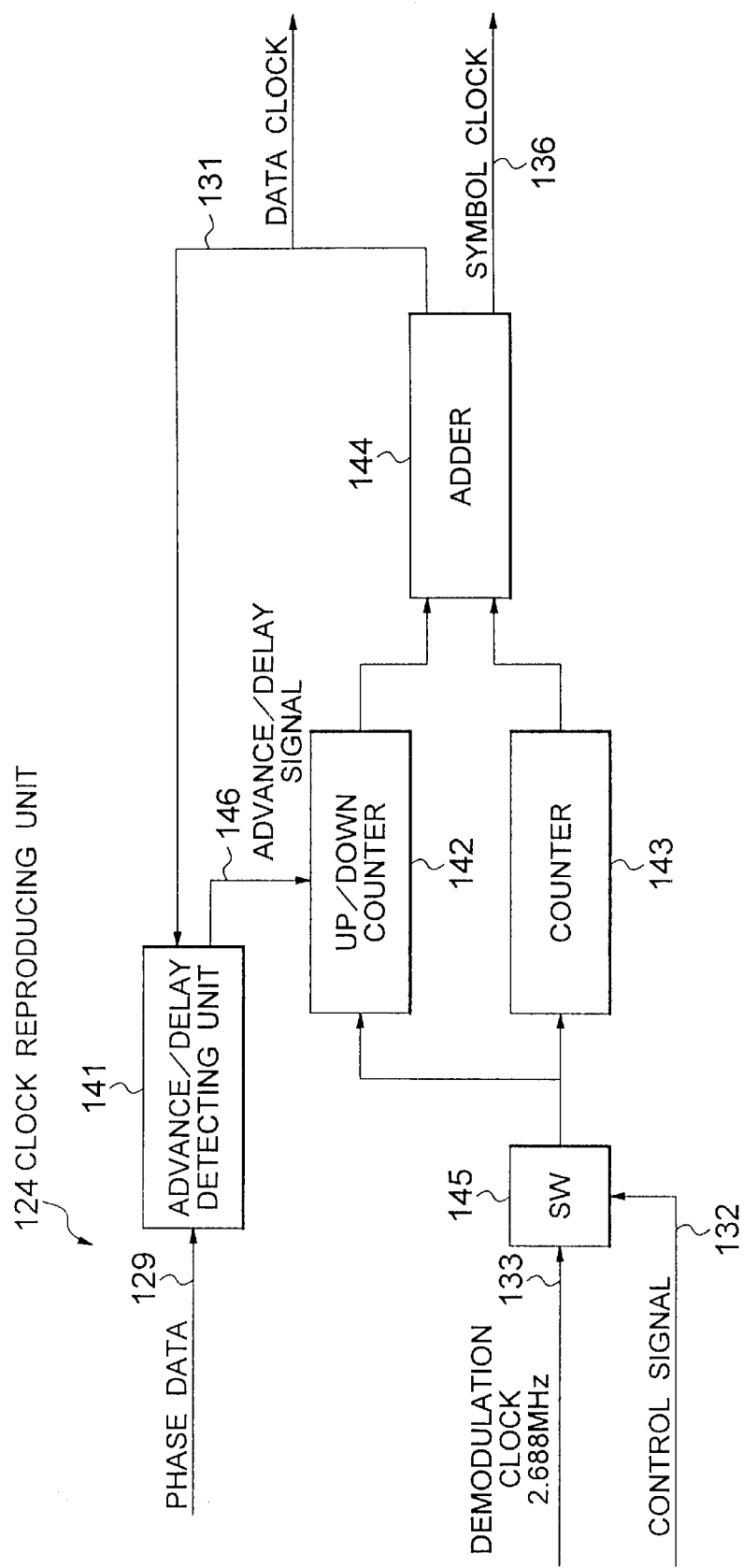
FIG. 3 shows a block diagram representing details of a clock reproducing unit 124 shown in FIG. 2.

Next, description is made about the clock reproducing unit 124 with reference to FIG. 3.

Supplied from the phase detecting unit 121 with the phase data signal 129 and a data clock signal 131 generated by an adder 144 in the clock reproducing unit 124, an advance/delay detecting unit 141 determines the phase difference between the first half of a symbol period and the second half of the symbol period at timing of the data clock signal 131, and supplies the phase difference to a up/down counter 142 as an advance/delay signal 146. The symbol period is represented by the symbol clock signal 136.

A switch (SW) 145 is given the demodulation clock signal 133 from the demodulating clock unit 125 and the control signal 132 from the time measuring unit 126. The switch 145 controls transmission of the demodulation clock signal 133 to both the up/down counter 142 and a counter 143 in response to the control signal 132.

The counter 143 is composed of a counter of seven bits which counts up the demodulation clock signal (2.688 MHz). The up/down counter 142 carries out addition or subtraction at timing of the demodulation clock signal in response to the advance/delay signal 146.

The adder 144 adds an output value from the counter 143 and an output value from the up/down counter 142, and produces an output signal of seven bits. The seventh bit (MSB) of the output signal is supplied from the adder 144 to the phase detecting unit 121. On the other hand, the sixth bit of the output signal is supplied from the adder 144 to the advance/delay detecting unit 141 as the data clock signal 131 in the clock reproducing unit 124. The sixth bit of the output signal is also supplied to the controller 109 (FIG. 1).

It should be noted that the clock reproducing unit 124 is novel in view of the fact that the switch 145 is included in the illustrated clock reproducing unit 124.

Figure 4:
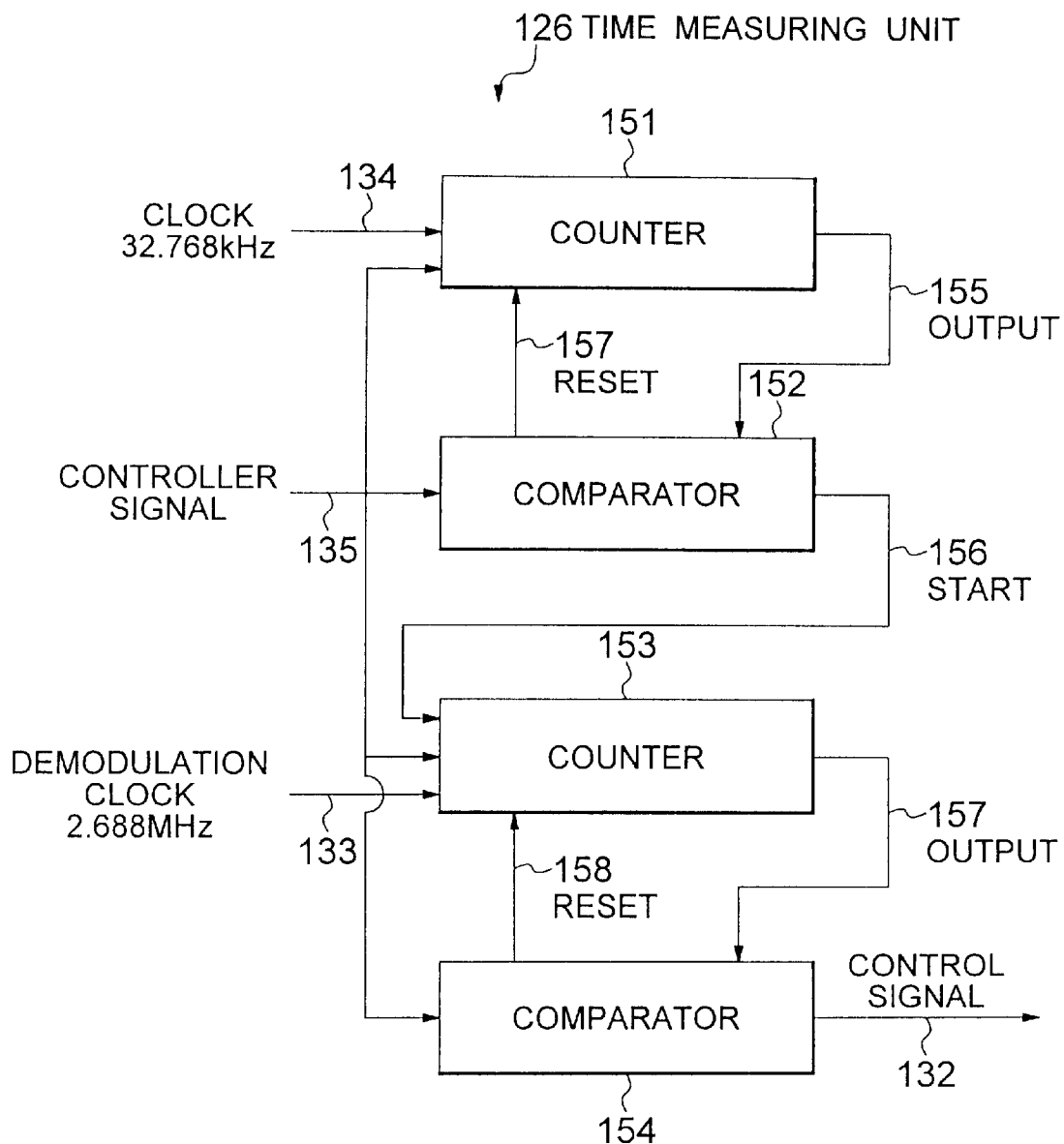
FIG. 4 shows a block diagram representing details of a time measuring unit 126 shown in FIG. 2.

Referring to FIG. 4, the time measuring unit 126 shown in FIG. 2 will be described in detail. The time measuring unit 126 has a counter 151 operable in response to the clock signal 134 sent from the clock unit 105 shown in FIG. 1 and another counter 153 operable in response to the demodulation clock signal 133 given from the demodulating clock unit 125. The counters 151 and 153 cooperate with comparators 152 and 154 in a manner to be described later in detail.

The counter 151 starts to count the clock signal 134 when the controller signal 135 which is supplied from the controller 109 is given to the comparator 152.

Predetermined values are set in response to the controller signal 135 to the comparators 152 and 154 from the controller 109 and will be described later in detail.

When the comparator 152 detects that the value set by the controller 109 is coincident with an output 155 of the counter 151, the comparator 152 sends a reset signal 157 to the counter 151 to reset a value of the counter 151 to zero, and subsequently the counter 151 is suspended. Furthermore, the comparator 152 sends a start signal 156 to the counter 153 and then, the counter 153 starts counting.

When the comparator 154 detects that the value set by the above mentioned controller 109 is coincident with an output 157 of the counter 153, the comparator 154 sends a reset signal 158 to the counter 153 to reset a value of the counter 153 to zero, and subsequently, the counter 153 is suspended. Furthermore, the comparator 154 outputs the control signal 132 to the clock reproducing unit 124. As described in connection to FIG. 3, the control signal 132 is supplied to the switch 145 of the clock reproducing unit 124 and, thereby, an input operation of the demodulation clock signal 133 to the counter 143 can be controlled.

Also, the predetermined values which are set to the two counters 151 and 153 by the controller 109 will be explained later in more detail.

Figure 5:
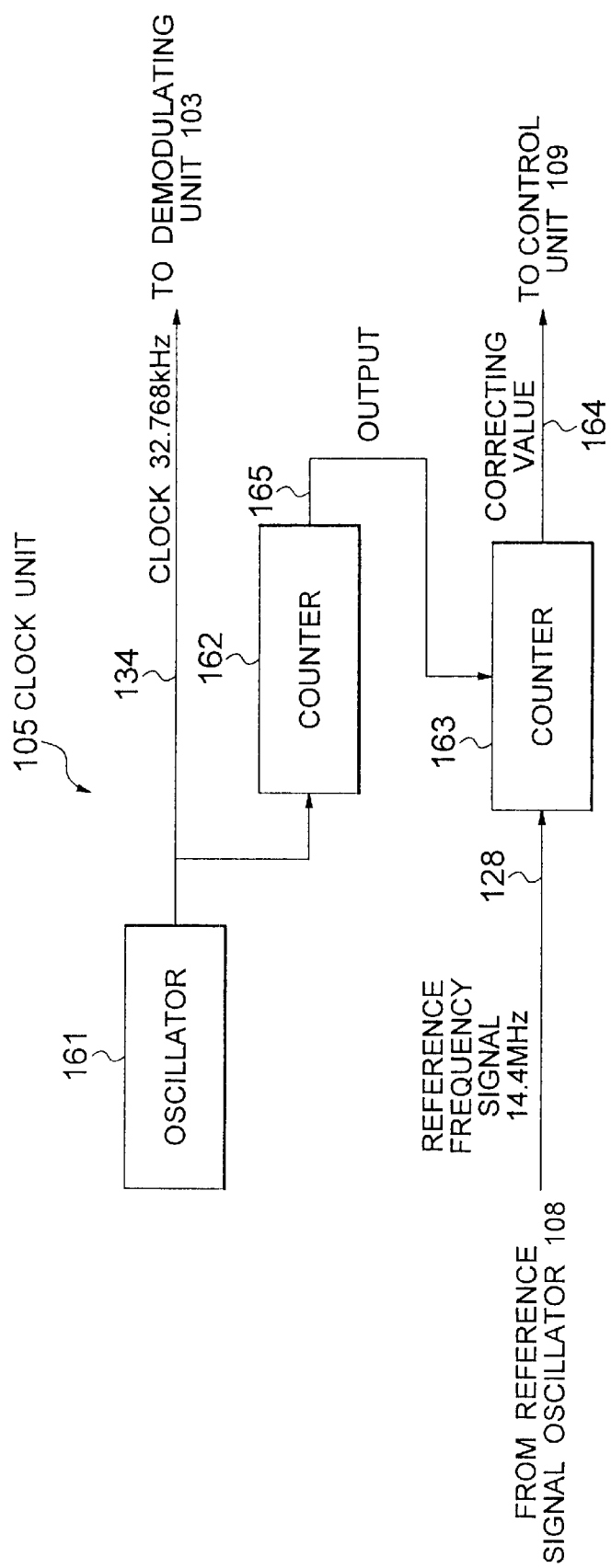
FIG. 5 shows a block diagram representing details of a clock unit 105 shown in FIG. 1.

Referring to FIG. 5, description will be made about the clock unit 105 illustrated in FIG. 5. The illustrated clock unit 105 comprises an oscillator 161 which employs a quartz crystal and which generates the clock signal 134 having a frequency of 32.768 kHz.

A counter 162 is operable in response to the clock signal 134 to send an output 165 to an additional counter 163 every time when the clock signal is counted to 2,752.

The additional counter 163 receives a reference frequency signal 128 having a frequency (14.4 MHz) from the reference oscillator 108 shown in FIG. 1, counts up the reference frequency signal for an interval period of the output 165, and outputs the counting result to the controller 109 as an error correcting value 164.

As described above, the reference frequency signal 128 is extremely accurate. Further, since the reference frequency signal 128 is controlled by the AFC unit 104 so that the reference frequency signal becomes close to a frequency of the base station on the basis of the error correcting data signal supplied from the demodulating unit 103, the reference frequency signal 128 becomes still accurate. Therefore, if there is a deviation (error) in the frequency of signal from the oscillator 161, it is possible to determine the error by using the error correcting value 164.

Figure 6:
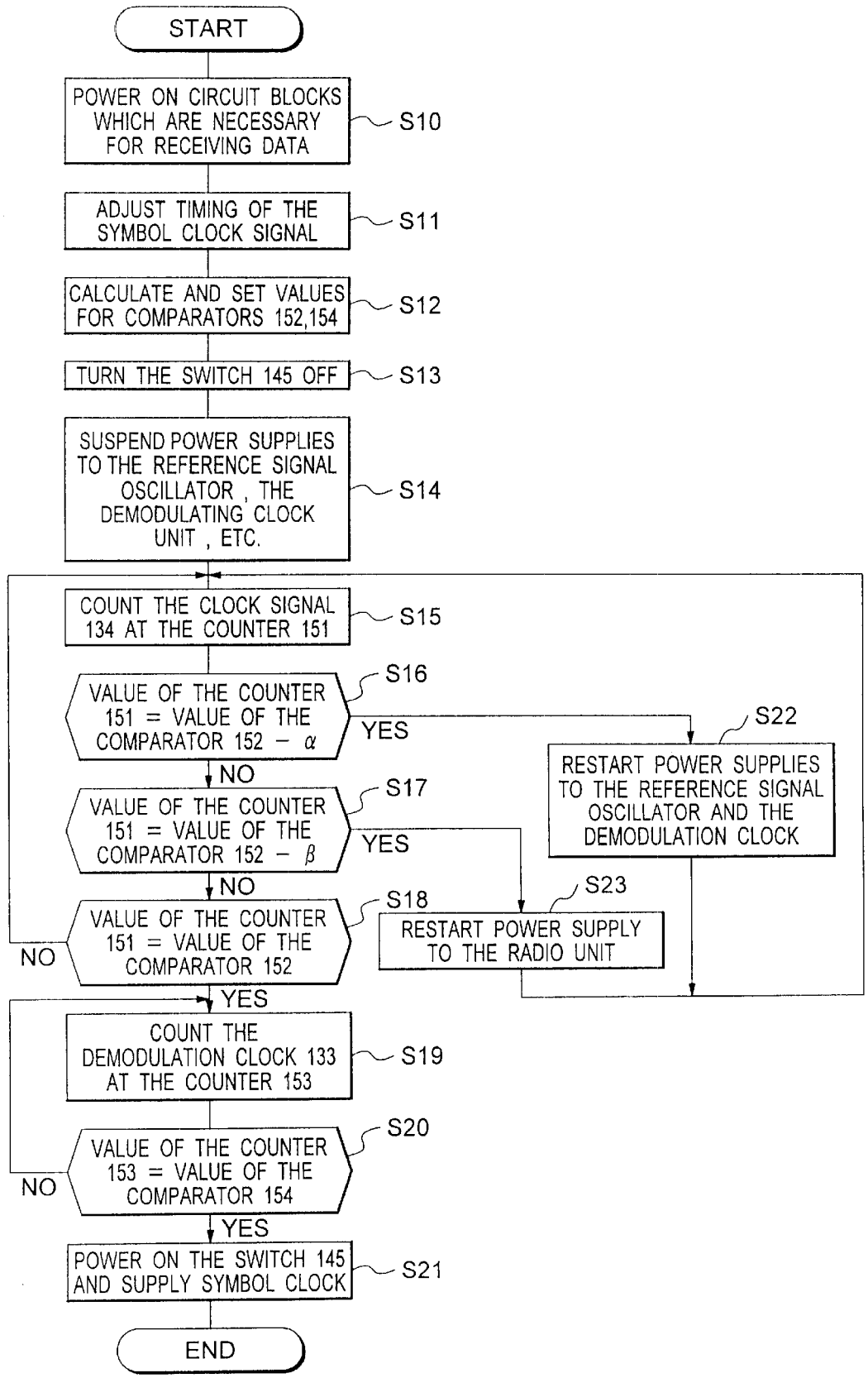
FIG. 6 shows a configuration of slots used in a three-slots TDMA.

Next, timeslots used in the embodiment of the digital cellular phone operable as a communication device are described with reference to FIG. 6. The communication device is assumed to be used in a digital cellular system (PDS) in JAPAN. The system employs three-slots TDMA. This method uses a plurality of super frames each of which is sequentially continued and which is divided into 36 groups (from the first group to the 36-th group) and each group corresponds to a unique number identifying a cellular phone. Each of the groups further includes three slots each of which has a time interval or length of 20/3 ms (hereinafter, simply referred to as "6.7 ms") . Therefore, a group has a time length corresponding to three slots, that is, 20 ms (=20/3*3). A super frame has a time length corresponding to 36 groups, that is 720 ms (=20*36).

Each slot is assigned to reception of a call signal for a certain communication device. Therefore, a call signal receiving slot which is assigned to the certain communication device is repeated at intervals of 720 ms. Within the remaining time interval of 713.3 ms (=720−6.7) except the assigned slot, the communication device is not called.

Therefore, the circuit elements related to reception operation in the device may be turned off within the remaining time interval. In the instant specification, description has been restricted to the three-slots TDMA. However, it is possible to apply the method and the device according to this invention to the other communication methods when they employ an intermittent receiving method which ensures that the communication device receives/sends a signal at a fixed or a regular interval.

Next, referring to FIGS. 7 and 8, description will be made about overall operations of the digital cellular phone according to the embodiment of the invention of the invention illustrated in FIGS. 1 through 5.

Figure 8:
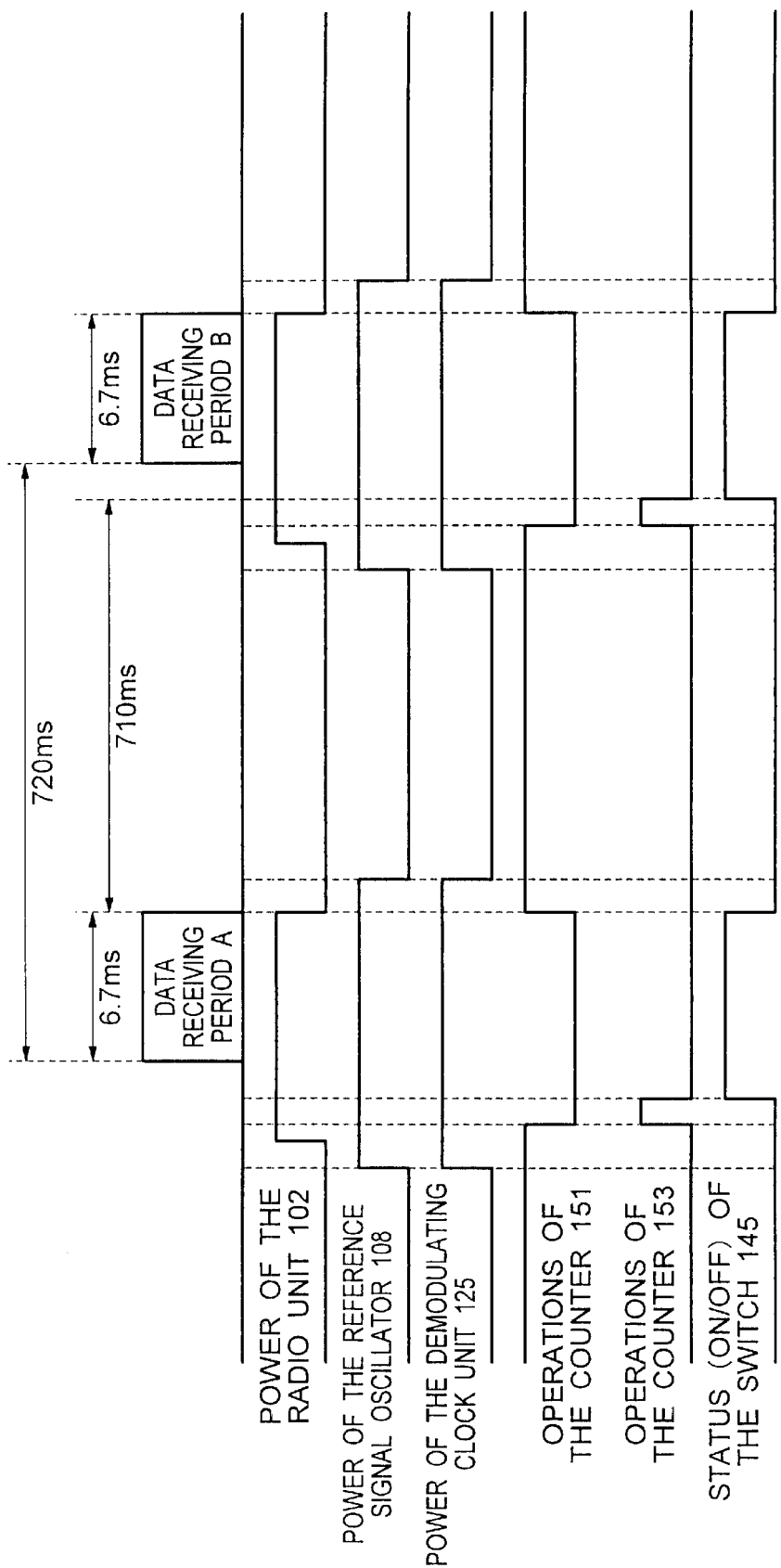
FIG. 8 shows a timing chart representing a timing of a part of operations of the digital cellular phone of an embodiment of the invention.

In FIG. 8, status transitions of the power supply of the radio unit 102, the reference oscillator 108, and the demodulation clock unit 125 are illustrated together with status transitions of operations of the counter 151 and the counter 153, and status transition of the switch 145. In this example, data receiving time intervals A and B are represented, each of which lasts for 6.7 ms. A time period between the starting points of the receiving periods A and B is equal to 720 ms.

At first, the controller 109 illustrated in FIG. 1 supplies, at a step S10 (FIG. 7), power to the radio unit 102, the reference oscillator 108, the demodulating clock unit 125 (FIG. 2) of the demodulating unit 103, and the other circuit blocks necessary for receiving data.

The step S10 proceeds to a step S11 at which data reception is started by the digital cellular phone. At the step S11, the clock reproducing unit 124 (FIG. 2) in the demodulating unit 103 adjusts timing of the symbol clock signal 136 so as to match symbol timing of the received signal with that of the symbol clock signal 136.

Figure 7:
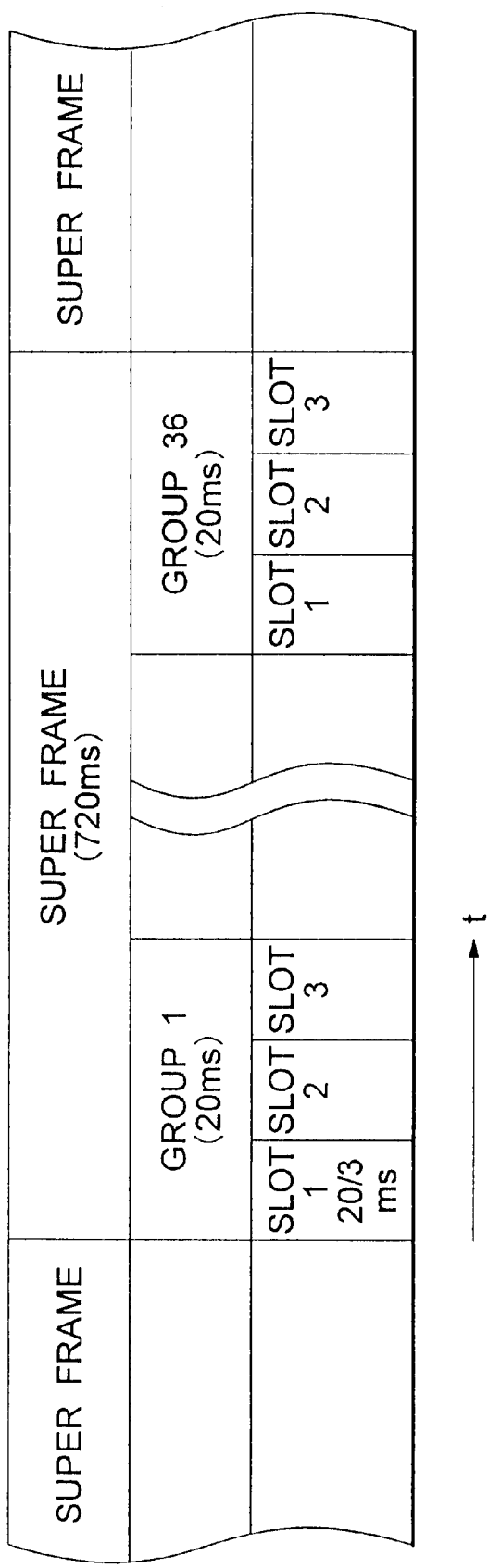
FIG. 7 shows a flowchart of an overall operations of a digital cellular phone of an embodiment of the invention.

The step S11 in FIG. 7 is followed by a step S12 at which the controller 109 (FIG. 1) calculates a value supplied to the counter 152 (FIG. 4) and a value supplied to the counter 153 (FIG. 4), and sets the values to the corresponding counters. As mentioned above, the value supplied to the counter 152 serves to stop counting the clock signal 134 and the value supplied to the counter 153 serves to stop counting the modulation clock signal 133. Thus, the counters 152 and 153 serve as the time measuring unit to measure elapse of a predetermined period. Also, the frequency (32.768 kHz) of the clock signal 134 which is generated by the oscillator 161 (FIG. 5) is far lower than that (2.688 MHz) of the demodulation clock signal 133 which is generated by the reference signal oscillator 108. The most of the predetermined period is measured by the counter 151 by counting the clock signal 134 and the remaining time of the period (which is shorter than a cycle of the clock signal 134) is precisely measured by the counter 153 by counting the demodulation clock signal 133.

This is very effective to save power consumption, because the predetermined time period is measured by a low frequency clock signal of low power consumption for a long time and by a high frequency clock signal of high power consumption for a very short time. A method of determining the values will be described later.

At a step S13 (FIG. 7) following the step S12, the controller 19 sends the controller signal 135 to the time measuring unit 126 (FIG. 2) of the demodulating unit 103. Responsive to the controller signal 135, the time measuring unit 126 (FIG. 4) supplies the control signal 132 to the clock reproducing unit 124 (FIG. 3). Supplied with the control signal 132, the clock reproducing unit 124 controls the switch 145 and stops the power supply by the switch 145. Herein, it is assumed that a time period for which the clock reproducing unit 124 is to be stopped is equal to 710 ms. The time period is determined, for example, by subtracting an allowance time from a time interval (713.3 ms) for which a communication device is not needed to receive data in the three-slots TDMA used in a digital cellular phone system (PDC) which will be explained later in connection to FIG. 6.

As described above, the process at the step S13 (FIG. 7) shuts off the power supply by the switch 145. This timing corresponds to the first trailing edge of the waveform shown in FIG. 8 for the switch 145. The processes at steps S10 to S12 are done before the first trailing edge, and the first data receiving time interval A also ends at the first trailing edge.

Then, a value of the counter 143 is maintained, because the modulation clock signal 133 does not enter into the counter 143. The value of the counter 143 is a positive integer and generally takes either one value from one to 128 cyclically. The above cycle from one to 128 corresponds to a cycle of the symbol clock signal. Since the value represents the phase timing of the symbol clock when the switch 145 is powered off and the value is held for the period which the switch 145 is powered off, the symbol clock can be restarted without causing phase shift to occur.

Next, at a step S14, the controller 109 suspends the power supply of the radio unit 102, the reference oscillator 108, and the demodulating clock unit 125. Although, to simplify the flowchart, the above suspending processes are gathered into the step S14, process related to the radio unit 102 and the other processes should be performed at different timing from each other in the strict sense. The suspending process of the radio unit 102 is performed simultaneously with the power off of the switch 145, that is, the radio unit 102 may temporarily be put in an inactive state after data reception.

On the other hand, the power supplies of the reference oscillator 108 and the demodulation clock unit 125 may be suspended after the suspending process of the radio unit 102 (such suspension may be carried out after a step S15). This is because the reference frequency signal of the reference oscillator 108 is used to sort data or to decrypt the data signal after reception the data signal while the clock signal of the demodulation clock unit 125 is used to control timing of the other devices after reception of the data signal.

The process in the step S14 corresponds to each of the first trailing edges of the waveforms shown in FIG. 8 of the radio unit 102, the reference oscillator 108, and the demodulation clock unit 125. As described in connection with FIG. 7, power supplies to the reference oscillator 108 and the demodulation clock unit 125 are suspended a moment after the power supply of the radio unit 125 is suspended.

Then, at the step S15, the controller 109 start to count up the clock signal 134 using the counter 151. Here, the processes at the steps S13 to S15 are sequentially performed for convenience of the description. However, the processes, in fact, may be performed almost simultaneously.

As described above, at the step S15, the counter 151 is activated. This operation corresponds to the first leading edge of the waveform of the counter 151, as shown in FIG. 8, and counting the clock signal 134 is started from this time point.

At a step S16, it is determined whether or not a value of the counter 151 is coincident with the value (=α) in the comparator 152. The value α is representative of a spare time or the allowance time which is previously prepared to activate the reference oscillator 108 or the demodulating clock unit 125 so that the counter 153 can be quickly put into an active state immediately when the value of the counter 151 becomes equal to the value α. In other words, the allowance time is representative of a time interval from a start of power supply to a stable state of each of the reference oscillator 108 or the demodulating clock unit 125. The time interval may be equal to 3 milliseconds or so.

At a step S16, when the value of the counter 151 is equal to the value in the comparator 152 (=α), the process proceeds to step S22, and then power supplies to the reference oscillator 108 and the demodulating clock unit 125 are restarted as described above.

At the step S16, if it is determined that the value of the counter 151 is not equal to the value α, the process proceeds to a step S17, and then it is determined whether or not the value of the counter 151 is equal to a value in the comparator 152 (=β). The value β is representative of an allowance time which is prepared to activate the radio unit 102 in advance so that received data signal can be immediately demodulated when the value of the counter 151 becomes equal to the value β. Since it is necessary that the radio unit 102 is activated in advance at a step S20 so that the unit 102 operates normally when the value of the counter 153 becomes equal to the value in the comparator 154, the determination should be originally performed in the second loop shown in FIG. 7 (the loop including steps S19 and S20). However, as described above, a time interval counted by using the counter 153 is about 2.6 μs and therefore is very short. On the other hand, a period time from a start of power supply to the radio unit 102 to a stable operation of the radio unit 102 is about 100 μs. Therefore, in this embodiment, the time point to restart supplying power of the radio unit 102 should be determined in the first loop shown in FIG. 7 (the loop including steps S15 to S18).

However, such decision of power supplying points is not strictly limited to the manner mentioned in conjunction with FIG. 7, since the radio unit 102 would be changed in performance in the future.

At a step S17, if the value of the counter 151 is equal to the value of the comparator 152 (=β), the step proceeds to step S23 and power is supplied to the radio unit 102 as described above.

At the step S17, if the value of the counter 151 is not equal to the value β, the process proceeds to a step S18 at which it is determined whether or not the value of the counter 151 is equal to the value in the comparator 152.

At the step S18, if it is determined that the value of the counter 151 is not equal to the value in the comparator 152, the process returns to step S15 and then, counting the clock signal 134 is repeated.

On the other hand, if it is determined that the value of the counter 151 is equal to the value in the comparator 152 at step S18, the process proceeds to step S19 at which the counter 153 is activated to count the demodulation clock signal 133.

A time point at which the counter 153 starts counting at the step S19 can be made to correspond to the second leading edge of the waveform of the counter 153, as shown in FIG. 8. Simultaneously with the start of the counter 153, the counter 151 is stopped, as depicted by 151 in FIG. 8. As depicted by 108, 125, and 102 in FIG. 8, the reference oscillator 108, the demodulation clock unit 125, and the radio unit 102 are supplied with power before the counter 151 is put into the inactive state, as readily understood from the steps S22 and S23 described later.

Next, the process proceeds to a step S20 at which it is determined that the value of the counter 153 is equal to the value in the comparator 154.

If the result of the determination is false (NO), the process returns to step S19 and counting the demodulation clock signal 133 is repeated. If the result of the determination is true (YES), the process proceeds to a step S21, power is supplied to the switch 145, and counting the demodulation clock signal 133 is restarted by the counter 143. As described above, since the counter 143 remains holding the phase value when the power supply of the switch 145 is suspended, that is, the value before 710 ms, counting is performed from the value and therefore, it is possible to generate the symbol clock signal 136 without any phase shift.

A time point at which demodulating the received data is prepared at step S21 corresponds to the second leading edge of the waveform depicted by 153 in FIG. 8. Also, it is found that the switch 145 is turned on at this time point.

In this example, a suspending time lasts for 710 ms from the end of the data receiving period A until the data signal can be received. In this case, however, the allowance time of 3.3 ms (=720−710−6.7) is left before the beginning of the next data receiving period B until the data signal can be received again. The allowance time is set in consideration of unevenness among starting operation times of elements in the communication device or the like. But, if the unevenness problem is resolved, the allowance time may be closer to zero. In this case, the suspending time should be still a multiple of a frequency of the symbol timing (21 kHz).

Next, description is made about the process of step S12 in FIG. 7, that is, a procedure to determine values to be set to the comparators 152 and 154 in the time measuring unit 126.

At first, the controller 109 reads the correcting value 164 from the clock unit 105 (FIG. 1). If a frequency of the clock signal 134 is a correct frequency, that is 32.768 kHz, the correcting value 164 will be 1,209,375 (=2,752*14,400,000/ 32,768). Herein, it is assumed that a value of the read out correcting value 164 is H.

Next, deviation of the clock signal 134 is calculated. Using the principle of derivation of the correcting value 164 of the clock unit 105 (principle of clock correcting circuit), the following equation is determined.

deviationx(ppm)=−1*(H−1,209,375)*(100/120)

Therefore, a frequency F1 of the clock signal 134 can be represented by the equation.

F1=32.768*(1+X/1,000,000) (kHz)

Generally, deviation of a clock signal having a frequency of 32.768 kHz is relatively large. Therefore, it is very important to consider the above deviation.

To suspend a symbol clock 136 when the phase of the signal is θ and restart the signal after a predetermined time period with the same phase, a value of a counter (the counter 143 of the clock reproducing unit 124) should be stored when the phase of the signal is θ and thereafter, the counter 143 should be restarted at precisely n cycles after. Therefore, operation retaining time of the clock reproducing unit 124 should be a multiple of a frequency of the symbol clock 136 (21 kHz). In this case, the operation retaining time is set to 710 ms. As shown in the following equation, the number 710 can be divided by 1/21.

nd=710/(1/21 (kHz))=14,910 n=14,910, T=710 ms

Next, the time T should be represented by using n1 cycles of the clock signal 134 (32.768 kHz) (T1) and n2 cycles of the demodulation clock signal 133 (2.688 kHz) (T2). Therefore, T=T1+T2.

A count value of the clock signal 134 is n1d, that is 710 ms/(1/F1)) . Herein, assuming that H=1,209,365, calculations are made as the following equations.

X=−1*(1,209,365−1,209,375)*(100/120)=8.333333 ppm

F1=32.768*(1+8.333333/1,000,000)=32.76827307 kHz n1d=710 ms/(1/F1)=710 ms*F1=710*32.76827307=23,265.47388

Herein, taking only an integer part of n1d, n1=23,265. Therefore, T1 can be represented as the following equation.

T1=n1*(1/32.76827307)=709.9855385 ms

The remaining time T2 is determined as the following equation.

T2=71031 709.9855385=0.0144615 ms

Therefore, count value of the demodulation clock signal 133 nd2 is determined as follows.

n2d=0.0144615 ms/(1/2,688 kHz)=38.872512

Herein, taking only an integer part of the n2d, n2=38.

T1 and T2 are determined from the above calculation. A value of T1 plus T2 is not always equal to a value of T, since T is represented using two kinds of frequencies of clock signals (T1, T2). However, if design of the communication device allows an error of symbol point time in a range of (a cycle time of the symbol clock signal *3/128, that is (1/21 kHz)*(3/128)=1.1 μs), such an error is not problem. In this case, the error is less than 1/2.688 MHz=0.37 μs since the demodulation clock signal 133 (2.688 MHz) is used to represent T.

Consequently, it is determined that a setting value of the comparator 152 is 232,365 and a setting value of the comparator 154 is 7.

According to the communication device of the invention, it is possible to suspend power supply to the radio unit 102, the reference oscillator 108, and the demodulating unit 103 at all the time period except during the device is expected to receive a call signal.

Further, the device according to the invention can reduce power consumption by using only the lowest frequency of clock signal during the suspending time period.

Further, the device according to the invention prepares a plurality of counters not to cause a phase shift of the symbol clock signal in restarting the power supply, and thereby can regenerate proper symbol clock signal.

Still further, the device according to the invention can precisely measure a time period relating to intermittent radio signal receiving by using a lower frequency of clock signal and a higher frequency of clock signal, and thereby can reduce power consumption.

What is claimed is:

1. A communication device which receives digital data via a radio signal comprises:
   a first oscillator which generates a first frequency of a first signal;
   a second oscillator which generates a second frequency of a second signal;
   a symbol clock circuit which generates a symbol clock signal by using the second signal; and
   a controller which suspends supply of the second signal to the symbol clock circuit to stop generating the symbol clock for a predetermined time period when the digital data is expected not to be received; and a third oscillator which generates a third signal, frequency of the signal is lower than the second frequency; and a time measuring device which measures the predetermined time period by counting the number of cycles of the second signal and the number of cycles of the third signal.

2. The device of claim 1, wherein the device further comprises a circuit which is not used when the digital data are not received, and the controller controls to suspend power supply of the circuit for a predetermined time period when the digital data are not received.

3. The device of claim 2, wherein the symbol clock circuit includes a first counter to hold a value of phase timing of the symbol clock signal when the supply of the second signal is suspended, and restart generating the symbol clock signal without phase shift by using the value of the first counter.

4. The device of claim 2, wherein said controller suspends power supplied to the first oscillator and the second oscillator for a time period which is shorter than the predetermined time period and which is a part of the predetermined time period.

5. The device of claim 4, wherein the time measuring device comprises:

a second counter which counts the number of cycles of the second signal;

a first comparator which compares the count value of the second counter with a first comparison value;

a third counter which counts the number of cycles of the third signal; and a second comparator which compares the count value of the third counter with a second comparison value.

6. The device of claim 5, wherein the first comparison value and the second comparison value are determined so that the sum of the product of a time period of a cycle of the second signal by the first value and the product of a time period of a cycle of the third signal by the second value is equal to the predetermined time period or is approximated in a range of the predetermined time period, and the first comparison value and the second comparison value are set to the first comparator and the second comparator, respectively, and wherein counting of cycles of the third signal is started by using the third counter at the beginning of the predetermined time period, counting of cycles of the second signal is started by using the second counter when the count value of the third counter is equal to the second comparison value, and the end of the predetermined time period is determined when the count value of the second counter is equal to the first comparison value, thereby the predetermined time period is measured.

7. The device of claim 6, wherein the device comprises:

a fourth counter which counts cycles of the third signal to a predetermined number; and a fifth counter which counts cycles of the first signal until the count value of the second counter is equal to the predetermined number, the controller calculates a frequency deviation of the third oscillator using the count value of the fifth counter.

8. The device of claim 6, wherein a high precision frequency of the third signal is determined from the frequency deviation of the third oscillator, and when the first comparison value and the second comparison value are determined, the high precision frequency of the third signal is used.

9. The device of claim 6, wherein the second comparison value is determined so that the second comparison value is larger than the first comparison value.

10. The device of claim 9, wherein powers of the first oscillator and the second oscillator are supplied before the counting of cycles of the second signal when the predetermined time period is measured.

11. The device of claim 9, wherein powers of the circuit which is not used when the digital data are not received is supplied before the end of the counting of cycles of the second signal when the predetermined time period is measured.

12. The device of claim 2, wherein the first oscillator is controlled by Automatic Frequency Control.

13. A method of controlling power supplies of circuits in a communication device which receives digital data via a radio signal and comprises a first oscillator which generates a first frequency of a first signal, a second oscillator which generates a second frequency of a second signal, and a symbol clock circuit which generates a symbol clock signal by using the second signal, the method comprising the steps of:

suspending supply of the second signal to the symbol clock circuit for a predetermined time period to stop generating the symbol clock; and determining a second repeat number of cycles of the second signal and a first repeat number of cycles of the third signal having a frequency lower than the frequency of the second signal so that the sum of the product of a time period of a cycle of the third signal by the first repeat number and the product of a time period of a cycle of the second signal by the second repeat number is equal to the predetermined time period or is approximated in a range of the predetermined time period; and measuring the predetermined time period by repeating a cycle of the third signal a plurality of times corresponding to the first repeat number and repeating a cycle of the second signal a plurality of times corresponding to the second repeat number.

14. The method of claim 13, further comprising the step of:

suspending, when the digital data are not received, power supply of the circuit which is not used when the digital data are not received, for a predetermined time period.

15. The method of claim 13, further comprising the steps of:

holding a value of phase timing of the symbol clock signal when the supply of the second signal to the symbol clock circuit is suspended;

restarting the supply of the second signal to the symbol clock circuit when the predetermined time period is passed; and restarting generation of the symbol clock signal without phase shift when the supply of the second signal is restarted by using the value of phase timing of the symbol clock signal which is held in the holding step.

16. The method of claim 13, further comprising the steps of:

suspending power supplied to the first oscillator and the second oscillator for a time period which is shorter than the predetermined time period and which is a part of the predetermined time period.

17. A recording medium readable by a computer, tangibly embodying a program of instructions executable by the computer to perform a method of measuring a time period in a communication device which receives digital data via a radio signal, the method comprising the steps of:

determining a first repeat number of cycles of a first signal and a second repeat number of cycles of a second signal having a frequency higher than the frequency of the first signal so that the sum of the product of a time period of a cycle of the first signal by the first repeat number and the product of a time period of a cycle of the second signal by the second repeat number is equal to a predetermined time period or is approximated in a range of the predetermined time period; and measuring the predetermined time period by repeating a cycle of the first signal a plurality of times corresponding to the first repeat number and repeating a cycle of the second signal a plurality of times corresponding to the second repeat number.

* * * * *